2,867,567

PROCESS OF PREPARING ANTI-HAEMOPHILIC GLOBULIN

Ethel Bidwell, Oxford, England, assignor to National Research Development Corporation, London, England, a British body corporate No Drawing. Application January 20, 1956
Serial No. 560,289

Claims priority, application Great Britain
January 21, 1955

14 Claims. (Cl. 167—74)

It has now become recognized that normal—i. e. non-haemophilic—human blood contains a factor which is absent from human haemophilic blood and that this factor is associated with the globulin fraction. The factor has become known as anti-haemophilic globulin (A. H. G.).

Various methods for the isolation of A. H. G. from human normal blood have already been proposed; among these may be mentioned adsorption of A. H. G. by kaolin followed by elution; precipitation with alcohol; dilution followed by acidification to precipitate globulin as well as the methods of Taylor (1937), Pohle and Taylor (1937), Lozner et al. (1939), Lewis, Davidson, Minot, Soulier, Tagnon and Taylor (1946), and Lewis, Soulier and Taylor (1946).

Bovine blood has an A. H. G. activity per milligram of nitrogen content which is, on average, about thirteen times that of human blood. In both types of blood the activity is very variable. Working with bovine blood, Spaet and Kinsell were able to obtain a preparation which showed an activity of a much greater order than that exhibited by the preparations obtained from human blood by previous workers.

Quite apart from the limiting factor of availability of the starting material in the case of preparations using human blood, these processes have proved to be unreliable in practice, the A. H. G. activity of the fraction tending to be lost during isolation. Nevertheless, they have led to the production of sufficient quantities of preparations of activity, high compared with normal human blood, to enable useful physiological experiments to be carried out and indeed to enable attempts to be made to treat haemophilic emergencies.

The usual procedure for estimating the A. H. G. activity of a preparation involves observations on its effect in accelerating the clotting time of haemophilic blood in vitro. The clotting time of haemophilic blood is decreased to normal in the presence of only from 2% to 5% of the normal amount of A. H. G. and as, has now been discovered, merely treating a haemophilic patient with sufficient of an A. H. G. preparation to lower the clotting time to normal gives little benefit. It has now been found from clinical experience with the preparation provided by the present invention that successful treatment with even the best of the previously described preparations could not have been achieved by supplying to the patient an amount thereof lying within the practically possible limit. By the process to be described, it is a simple matter to produce, from bovine plasma, A. H. G. preparations having an activity, on a dry weight basis, at least four times that obtained by the methods of Spaet and Kinsell. Similar results are obtainable with sheep or pig plasma. The new preparations have been shown to be of considerable value in the treatment of haemophilic emergencies and are believed to be the first ever obtained which have a sufficient high activity to be of real value to the patent.

According to the present invention there is provided a process for the preparation of anti-haemophilic globulin which comprises adding to the supernatant liquid obtainable from bovine, pig or sheep blood plasma by contacting said plasma with aluminum hydroxide gel and thereby adsorbing the prothrombin, a phosphate or citrate in a quantity at least equal to but not substantially exceeding that required to produce a small but definite precipitate while maintaining the pH at from 6.0 to 7.0. It is probable that the treatment of bovine, pig or sheep plasma with aluminum hydroxide gel removes the Christmas factor and factor 7. For reasons which are not clearly understood, attempts to apply the foregoing process to human or horse plasma led to a product which showed little or no activity.

The blood plasma used as starting material is preferably of course prepared and used as soon as possible after the blood has been taken from the animal or animals. The fresh blood may be stabilised in the normal manner by the addition of anti-coagulants such as citrates and dextran sulphate. There is some evidence, although it is not conclusive, that the presence of dextran sulphate in the plasma has a beneficial effect on the precipitation. The presence of dextran itself has no such beneficial effect.

The foregoing process is found to be inherently capable of control to suit the particular sample of plasma treated. The process is successful in this direction because it only involves one variable—the amount of phosphate or citrate added—which must be adjusted in accordance with the characteristics of the blood and because this step is actually self-indicating in character, i. e. when the correct amount has been added, this fact is indicated by the appearance of the precipitate and there is no question of only being able to determine whether or not the correct amount has been added by the success of a later stage of the process when correction has become impossible. In carrying out the process, the quantity required for a particular sample of plasma can be added progressively until the precipitate appears. Alternatively, the amount can be estimated from a pilot experiment on a small portion of the sample and then added as a whole to the main batch.

The phosphate or citrate is most conveniently employed in the form of an aqueous solution. It may less conveniently be added in the solid state, however, provided that care is taken to ensure that local high concentrations in the mixture are avoided.

It is convenient in practice to add the phosphate or citrate in the form of an aqueous buffered solution of appropriate pH value, thereby avoiding any necessity to employ independent measures for the control of the pH of the mixture. Preferably, sufficient water is added to the plasma prior to or during the precipitation to give a final volume of mixture, on completion of the precipitation, which is at least 150% of the volume of the said supernatant liquid (prothrombin-free plasma). In practice this is best achieved by using a solution of phosphate or citrate having an appropriately chosen concentration.

The use of no water, or of insufficient water to render the final volume of the mixture 150% of that of the supernatant liquid, tends to allow the precipitation of an unduly high proportion of extraneous substances which are retained mechanically in the precipitate and which render the further purification of A. H. G. more difficult. As will be understood, the intrinsic difficulties of purification of A. H. G. render every stage thereof a source of potential destruction of its activity. It is found that by using a quantity of water at least equal to that referred to above, usefully purified fractions can be prepared after only two or three further stages of purification. There is virtually no upper limit to the amount of water which may be present at the end of precipitation but obviously as the precipitate has to be freed from this water, the amount of water should for practical reasons be kept as low as possible consistent with good results. It is found that excellent precipitation results consistent with convenience of recovery of the precipitate, e. g. at the centrifuge, are obtained when the total volume of the mixture on completion of the precipitation is substantially 200% of the volume of the said supernatant liquid.

The precipitation can, of course, be effected at any temperature at which the A. H. G. can retain a useful proportion of its activity over the period of time involved. It is found, however, that relatively high temperatures, e. g. 20°–25° C., render further purification in the later stages more difficult. It is preferred to conduct the precipitation at a temperature of less than 15° C., a final temperature of substantially 10° C. has been found to give excellent results.

It is not claimed that the process is always absolutely certain in its operation. Occasionally, it is found to give a precipitate whose activity is considerably lower than expected. This effect is observed far more frequently with citrate precipitation than with phosphate precipitation. For this reason, although citrates are sufficiently reliable to give very good average results over a long series of samples, phosphates are preferred.

The precipitate may be further purified as regards its A. H. G. content by contacting it in the solid or in the dissolved state with a solution of sodium citrate having a concentration such that the required fraction is insoluble therein and discarding the sodium citrate-soluble portion. A concentration of from 7.5–8% by weight is usually required. The inactivating effect of the citrate at this stage is far less pronounced than in the initial stage of purification. It is, therefore, preferred to employ a phosphate in the first stage even though sodium citrate is to be used later in subsequent purification stages. It is satisfactory to contact the precipitate with the sodium citrate merely by suspending it in a solution thereof. Better results, however, are obtained by dissolving the precipitate, or as much of the precipitate as will in fact dissolve, in saline and then adding the sodium citrate to the resulting solution thereby precipitating the required sodium citrate-insoluble portion. In either case, the temperature of treatment is preferably not in excess of 15° C., a temperature of 12° to 15° C. being preferred.

The precipitate (or residue) as obtained from the purification stage above may be further purified by further similar treatments with sodium citrate. In this manner, a ten-fold increase in purity has been obtained. The final material may be freeze-dried without substantial loss of activity and finally sterilized for clinical use by ultra-violet irradiation.

Potassium citrate may be used, if desired, but sodium citrate is normally chosen in order to avoid introducing potassium ions into the material at this stage. Potassium phosphate is found to give much more consistent results than does sodium phosphate in the precipitation stage. It is found that the use of potassium phosphate for precipitation followed by the use of sodium citrate for the subsequent stage or stages of purification gives a product which is clinically quite acceptable as regards its potassium content.

Reference has been made above to the use, for the first precipitation, of a quantity of phosphate or citrate at least equal to, but not substantially exceeding, that required to produce a small but definite precipitate. The maximum amount which may be added without increasing the proportion of inactive material precipitated depends, as would be expected, upon the precise conditions of operation including the variety and condition of the animal or animals from which the blood is obtained. As with most precipitation processes, the wanted fraction is precipitated progressively as the factor producing precipitation—in this case the quantity of phosphate or citrate—is adjusted. The required fraction can therefore, with care, be produced in stages by adding the precipitant progressively. Earlier and later precipitated portions of the fraction can therefore be obtained separately, and can be subjected separately to further purification and tests for activity. It is not surprising that the quantities of A. H. G. found in such separately obtained portions differ among themselves. Sometimes it is found that the material first precipitated is substantially less active than the material later precipitated. By careful trial, is is often possible by rejecting a first-formed precipitate of low activity or by using the minimum amount of phosphate or citrate to produce only a small precipitate to obtain a product having a higher activity, or requiring less further purification, than would otherwise be the case. Thus it is within the scope of the invention to pre-treat the supernatant liquid obtained by treating bovine, pig or sheep plasma with aluminum hydroxide gel by adding thereto sufficient phosphate or citrate to produce a small precipitate of low activity and then to add to the resulting supernatant liquid the further quantity of phosphate or citrate required to produce a small precipitate or higher activity. It must be emphasized, however, that it is in no way essential, where a product of only medium to good activity is required, to precipitate it in stages. All that is necessary is to avoid using a final quantity of phosphate or citrate which exceeds, by a substantial amount, that required to produce the first small but definite precipitate i. e. by an amount such that an unacceptably large proportion of inactive material is precipitated. The first indication of the definite precipitate—which occurs in the phosphate or citrate pre-treatment step if such is used—when the phosphate or citrate is being added progressively to the main batch or to a pilot sample, indicates the approach of the end point. Readily acquired experience must be applied by the operator in determining how much more phosphate or citrate is permissible.

The detailed examples of experimental procedure which follow are given in order to illustrate the invention. In these examples, all proportions referred to are proportions by weight except where the contrary is stated. It will be noted that in all the examples the precipitant was added in the form of a buffer solution having a volume equal to that of the plasma thus giving a final volume of 200%. The amount of precipitant required to give the small but definite precipitate was provided by appropriately arranging its concentration in the solution using a pilot experiment on a small proportion of the plasma as a guide. This technique was chosen in order to maintain constant the final protein concentration of the mixture thereby reducing the number of simultaneous variables in the experimental work. The technique may be employed if desired for regular production; alternatively the precipitant may be added progressively to the plasma until the small but definite precipitate is produced. In the latter case, a knowledge of the approximate amount of precipitant required is desirable as this knowledge allows the concentration of the precipitant solution to be chosen so that the final volume of the mixture is within the desired limits. It is difficult to determine the exact amount of precipitant on the basis of past experience alone; nevertheless a useful estimate can be made from previous results obtained with plasma from animals of the same variety and condition.

In the examples, reference is made to the A. H. G. activity of various materials. In all cases, activity was assayed by a method based on the work of Biggs and Douglas (1953) which involves comparison of the material under test with a standard by measuring the relative amounts of thromboplastin formed in a given time in a mixture containing all other known factors (i. e.

factors 5 and 7, Christmas factor, a phospholipid replacing platelets and calcium ions). The unit of A. H. G. activity employed herein is such that the average A. H. G. activity of normal human plasma is 0.27 unit per millilitre.

The reagents used in the examples were prepared as follows:

*2 M phosphate buffer.*—817 g. $KH_2PO_4$ ad 168 g. KOH were dissolved together and the solution made up to 3 litres with distilled water and filtered. Other concentrations were prepared by dilution. The pH of M phosphate prepared by diluting this buffer was 6.5 (glass electrode, standardised with 0.05 M potassium hydrogen phthalate pH 4.00).

*20% w./v. sodium citrate.*—200 g. trisodium citrate dihydrate (of analytical quality) dissolved in water and the solution made up to 1 litre. 3.8% w./v. sodium citrate was made by dilution.

*Saline.*—0.85% w./v. NaCl (analytical quality).

*Alumina (i. e. aluminium hydroxide gel).*—Prepared as described by Biggs and Macfarlane (1953).

*Dextran sulphate.*—In ampoules of 5 ml., potency approximately 1,000 (heparin) units per ml. as supplied by Dextran Limited or Glaxo Laboratories.

Bovine blood was obtained as follows. The animals were killed by a captive bolt and 3-4 litres of blood immediately collected from the jugular vein into a shallow enamelled dish previously rinsed wth the 3.8% sodium citrate solution. The blood was poured into a polythene bottle containing 100 ml. 3.8% citrate and 1 ampoule dextran sulphate for each litre of final volume. A sample of the same blood was placed in a separate bottle containing citrate, but no dextran sulphate, to be used for the estimation of A. H. G. activity in the original plasma. The time elapsing between the slaughter of the animal and mixing the blood into the anti-coagulant was less than half a minute; separation of the plasma for the purification process was actually begun within half-an hour. Pig blood was obtained in an analogous manner. With sheep, blood was taken from the live animal via a cannula inserted in the jugular vein thus avoiding contamination by contact with the wool.

The blood, however obtained, was centrifuged for 20 to 30 minutes at 2,000 R. P. M. and the plasma was separated.

Except where otherwise stated 5% v./v. alumina cream was added to the plasma, stirred for 15 minutes at room temperature, and centrifuged for 10 minutes at 2,000 R. P. M. This step had the added advantage of removing the remaining red cells. Probably most of the Christmas factor and factor 7 were removed at this stage. The precipitate was discarded.

In those cases where precipitation from the bovine plasma was effected by adding a quantity of phosphate the optimum phosphate concentration for precipitation was selected in a preliminary trial in which 10 ml. aliquots of alumina adsorbed plasma were treated with 10 ml. amounts of phosphate in concentration ranging from 1.3 M to 1.7 M; that concentration was chosen for the main batch which gave a small but definite precipitate. Plasma from old bulls and cows usually required much less phosphate than did plasma from 2- to 4-year old bullocks.

The plasma and phosphate were previously cooled so that the final temperature of the mixture was 10°. To the alumina adsorbed plasma was added an equal volume of phosphate buffer of the desired concentration. The precipitate was separated by centrifuging for 10 minutes at 2,000 R. P. M. and dissolved in the minimum amount of saline; any undissolved material could be removed by centrifuging. To this solution was added 0.67 vol. cold 20% w./v. sodium citrate. The precipitate was separated on a centrifuge and dissolved in saline. Sometimes the citrate precipitation was repeated. Insoluble material was removed on the centrifuge and the material was dried from the frozen state. The entire preparation from the slaughter of the animal to the commencement of freeze-drying occupied some five hours. Similar procedures were adopted for sheep and pig plasma and when using a citrate as precipitant.

Ultra-violet irradiation by 30 w. germicidal mercury lamp was used for bacteriological sterilization, since solutions of the high concentration required for injection could not be filtered through either a Seitz filter or a Berkefold candle, and would not pass through a Gradocol sterilizing membrane (Elford 1931, 1937) under 30 lbs. pressure.

The solutions contained 90–120 mg. dried material/ml. and were made by adding distilled water to the dry material, gently stirring by hand for 10–20 minutes until a viscous, slightly opalescent solution was obtained; insoluble material, including most of the contaminating bacteria, was removed by spinning in a high speed centrifuge for 10 minutes. The solution was transferred to a sterile quartz tube, shaped like a large ampoule. For 15 ml. of solution the dimensions of the tube were: length 20 cm., internal diameter 2.5 cm., neck length 3.0 cm., diameter 1.2 cm. The tube was closed with a sterile rubber bung and mounted horizontally approximately 6 inches beneath and parallel to the germicidal lamp. It was rotated about its long axis at about 30 revolutions per minute. The efficiency of the irradiation was increased by polished aluminium reflectors suitably placed. The stability of the product to ultra-violet irradiation varied from batch to batch, probably with purity. Relatively impure preparations (6 u./mg. N) could be irradiated for 20–30 minutes before a decline in activity became apparent but purer preparations (20 u./mg. N) could not be exposed longer than 5 minutes.

If the exposure time was prolonged beyond these limits the opalescence of the solution and its viscosity were markedly increased, and the A. H. G. activity diminished.

The clinical application of the material shows that activity as assayed in vitro runs parallel with activity in vivo.

The following Tables I and II give examples of the results obtained by following the detailed experimental procedures described above.

TABLE I

*Preparation of bovine A. H. G.*

| | Vol., ml. | Activity, u./ml. | Stage yield | Overall yield | Total nitrogen, mg./ml. | A.H.G. activity, u./mg. N | Purification overall |
|---|---|---|---|---|---|---|---|
| Bovine plasma | 1,220 | 3.3 | | | 9.02 | 0.366 | |
| Adsorbed with alumina, added equal vol. 1.58 M phosphate pH 6.6 precipitate dissolved in saline | 73 | 63 | 115 | 115 | 3.27 | 19.3 | 53 |
| 72 ml.+48 ml. 20% sod. citrate precipitate dissolved in saline | 25 | 143 | 79 | 91 | 2.77 | 52 | 140 |

TABLE II

The precipitate formed from alumina-adsorbed bovine plasma on addition of an equal volume of 1.5 M phosphate buffer was centrifuged, the supernatant liquid cooled and more phosphate (2.0 M) added to bring the final concentration to 0.80 M. Both precipitates were dissolved in saline, insoluble material was removed by centrifuging, and 0.67 vol. 20% w./v. sodium citrate added to the solution.

The resulting precipitate was dissolved in saline.

| | Vol., ml. | Activity, u./ml. | Total nitrogen, mg./ml. | A.H.G. activity, u./mg.N | Yield | Purification |
|---|---|---|---|---|---|---|
| Original plasma | 2,000 | 0.86 | 12.7 | 0.068 | | |
| After citrate fractionation: | | | | | | |
| (i) from phosphate precipitate at 0.75 M | 11 | 8.2 | 1.12 | 7.3 | 5.2 | 108 |
| (ii) from phosphate precipitate between 0.75 and 0.80 M | 31 | 37 | 1.90 | 19.5 | 67 | 290 |

In an experiment using sodium citrate as the precipitant, 450 ml. of sodium citrate buffer (20% by weight sodium citrate) were added to an equal volume of alumina adsorbed plasma. The resulting precipitate was separated at the centrifuge, stirred with sufficient saline to produce a volume of 150 ml. and again centrifuged. The residue was dissolved in saline to produce 75 ml. of solution. To 68 ml. of this solution were added 45 ml. of the same citrate buffer. The resulting purified precipitate was separated at the centrifuge and dissolved in saline to give 23 ml. of solution of which, after centrifuging, 19 ml. were freeze-dried. The freeze-dried product (933 mg.) contained 3.28% of nitrogen and showed an A. H. G. activity of 0.36 units/mg., i. e. 11 units/mg. N.

In another experiment 880 ml. of sheep plasma were treated with a 5% v./v. paste of aluminum hydroxide gel to give 900 ml. of supernatant liquid to which were added, at 8° C., 45 ml. of water and 855 ml. of 2 M phosphate buffer giving a final phosphate concentration of 0.95 M. The precipitate was dissolved in 0.85% saline to give 96 ml. of solution to which were added 64 ml. of 20% by weight citrate buffer. The purified precipitate produced thereby was dissolved in saline to produce 43 ml. of solution which were then freeze-dried to produce 3.82 g. of product containing 3.5% of nitrogen and having an A. H. G. activity of 1.0 unit/mg. or 29 units/mg. N.

In a further experiement 2910 ml. of plasma, obtained by centrifuging 6 litres of pig's blood, were treated with aluminum hydroxide gel, in the usual way, to yield 2900 ml. of supernatant liquid to which was added 0.175 volumes of water and 0.825 volume of the 2 M phosphate buffer, thereby giving a phosphate concentration of 0.825 M. The resulting precipitate was dissolved in saline to produce 150 ml. of solution. To the solution was added 100 ml. of 20% sodium citrate giving a final citrate concentration of 8%. The purified precipitate thus formed was dissolved in saline and centrifuged. 91 ml. of the residual solution were freeze-dried to yield 5.0 g. of product containing 3.79% of nitrogen. The product exhibited an A. H. G. activity of 0.65 units/mg., i. e. 17 units/mg. of nitrogen.

The product when produced from bovine blood by the process described herein contains a large proportion of nitrogen as clottable fibrinogen. It is therefore markedly different from the product described by Spaet and Kinsell (1953). It has been observed during clinical trials that it contains, like untreated bovine plasma, an agglutinin for human platelets. The product produced from pig blood has been found to be useful where the immunological sensitivity of the patient renders unwise the use of the product from bovine plasma. It has the added advantage of being free from any agglutinin for human platelets.

By the present invention it is easily possible to obtain a preparation of A. H. G. which, while undoubtedly being impure, possess an activity of at least 5 units per milligram of nitrogen, i. e. at least 200 times that of average normal human plasma. The dose required for treatment of an adult is about 650 units. At an activity of 5 units per milligram the required dose contains 800 mg. of protein, a quantity which lies close to the maximum quantity which an adult can tolerate. Since to give the required dose with even the best of the previously-described preparations would inevitably involve supplying several times the said maximum quantity of protein, the activity of a preparation assaying 5 units per milligram of nitrogen is of a significantly different order of magnitude from the activity associated with the previously-described preparations. It must accordingly be true to say that the present invention provides products which are qualitatively, rather than merely quantitatively different from products hitherto known. The present invention therefore provides, quite apart from a process of preparation, a product which is novel, i. e. a preparation having an A. H. G. activity of at least 5 units per milligram of nitrogen. As has been shown herein, preparations having an even higher activity can be prepared in accordance with the invention; indeed preparations having activities of from 15 to 20 units per milligram of nitrogen can, without difficulty, be made available for clinical use.

I claim:

1. A process for the preparation of anti-haemophilic globulin which comprises adding a salt selected from the group consisting of phosphates and citrates to a supernatant liquid while maintaining the pH of said liquid at from 6.0 to 7.0 and discontinuing the addition of said salt upon the appearance of a small but definite precipitate, the major portion of which is anti-haemophilic globulin, said supernatant liquid being obtainable from the blood plasma of Ungulata Artiodactyla by contacting said plasma with aluminum hydroxide gel to adsorb prothrombin and separating said supernatant liquid from the aluminum hydroxide gel containing adsorbed prothrombin.

2. A process according to claim 1 wherein said blood plasma is derived from a bovine animal.

3. A process according to claim 1 wherein said blood plasma is derived from a sheep.

4. A process according to claim 1 wherein said blood plasma is derived from a pig.

5. A process according to claim 1 wherein said precipitating salt is added in the form of an aqueous buffered solution of a pH of from 6.0 to 7.0.

6. A process according to claim 1 wherein precipitation is effected at a temperature not exceeding 15° C.

7. A process according to claim 1 wherein, after removal of the initial precipitate, a further amount of precipitating salt is added to produce a further precipitate and said further precipitate is recovered.

8. A process according to claim 1 wherein said blood plasma is stabilized by the addition of an anti-coagulant for blood plasma.

9. A process according to claim 8 wherein said anti-coagulant is dextran sulphate.

10. A process according to claim 1 wherein said precipitation solution is adjusted to a volume of at least 150% of the volume of said supernatant liquid.

11. A process according to claim 10 wherein the volume is adjusted to substantially 200% of the volume of the supernatant liquid.

12. A process according to claim 1 wherein the precipitate is purified by contacting it with a solution of sodium citrate.

13. A process according to claim 12 wherein the precipitating salt is an alkali metal phosphate.

14. A process according to claim 13 wherein the alkali metal phosphate is potassium phosphate.

(References on following page)

References Cited in the file of this patent

Avery: Archives of Biochem., vol. 16, January 1948, pp. 33–35.

Ware: J. Biol. Chem., vol. 172, January–February 1948, pp. 699–706.

U. S. Dispensatory, 25th ed., 1955, Lippincott Co., Phila., Pa., p. 1571.

Surgenor: J. of Physical and Colloid Chem., vol. 55, January 1951, pp. 94–101.